(12) United States Patent
Kreil (10) Patent No.: US 8,141,927 B2
(45) Date of Patent: Mar. 27, 2012

(54) CONTROL OF A SLIDE-OUT ROOM

(75) Inventor: Craig J. Kreil, Mishawaka, IN (US)

(73) Assignee: Actuant Corporation, Butler, WI (US)

(*) Notice: Subject to any disclaimer, the term of this patent is extended or adjusted under 35 U.S.C. 154(b) by 292 days.

(21) Appl. No.: 12/423,889

(22) Filed: Apr. 15, 2009

(65) Prior Publication Data
US 2009/0261610 A1   Oct. 22, 2009

Related U.S. Application Data

(60) Provisional application No. 61/046,228, filed on Apr. 18, 2008.

(51) Int. Cl.
*B60P 3/34* (2006.01)
(52) U.S. Cl. ............ 296/26.01; 296/165; 296/171; 296/175; 52/67
(58) Field of Classification Search ........ 296/26.01, 296/26.02, 26.03, 26.08, 26.09, 26.12, 26.13, 296/156, 165, 171, 172, 175, 176; 318/445; 52/67; *B60P 3/34*
See application file for complete search history.

(56) References Cited

U.S. PATENT DOCUMENTS

| | | | |
|---|---|---|---|
| 6,345,854 B1 | 2/2002 | McManus | |
| 6,471,275 B1 | 10/2002 | Kunz et al. | |
| 6,575,514 B2 | 6/2003 | McManus et al. | |
| 6,681,531 B2* | 1/2004 | McManus | 52/67 |
| 6,696,813 B2 | 2/2004 | McManus et al. | |
| 7,093,888 B2* | 8/2006 | Anderson et al. | 296/162 |
| 7,309,092 B2* | 12/2007 | Garceau et al. | 296/26.13 |
| 7,874,604 B2* | 1/2011 | Dixon et al. | 296/26.13 |

* cited by examiner

*Primary Examiner* — Glenn Dayoan
*Assistant Examiner* — Pinel Romain
(74) *Attorney, Agent, or Firm* — Quarles & Brady LLP (57) ABSTRACT

A control system for a slide-out room of a recreational vehicle includes a number of room slides which move the slide-out room between retracted and extended positions. If multiple room slides are used, a controller synchronizes the movement of the room slides to prevent damage to the components of the system. The retracted and extended positions of the slide-out room can be reset by the end user. The controller is also capable of detecting faults and communicating faults to the user via LEDs on a control panel. The controller automatically stops the motion of the slide-out room if a fault is detected. The control system includes a lock which is automatically disengaged before motion of the slide-out room. The lock is also automatically engaged when the slide-out room moves to the retracted position.

18 Claims, 10 Drawing Sheets

FIG. 11

CONTROL OF A SLIDE-OUT ROOM

CROSS-REFERENCE TO RELATED APPLICATIONS

This application claims the benefit of U.S. Provisional Application No. 61/046,228 filed on Apr. 18, 2008, which is hereby incorporated by reference.

STATEMENT REGARDING FEDERALLY SPONSORED RESEARCH OR DEVELOPMENT

Not applicable.

FIELD OF THE INVENTION

This invention generally relates to slide-out rooms of recreational vehicles, and more particularly, the motion control system of slide-out rooms.

BACKGROUND OF THE INVENTION

Recreational vehicles may include a slide-out room to increase the size of the living quarters of the vehicle while also permitting an appropriate size for highway travel. The slide-out room is moved by a number of actuators, for example hydraulic cylinders, electric drive screws or electric gear drives located on the recreational vehicle. A controller may be used to ensure synchronized movement of the multiple actuators. Additionally, slide-out rooms use either mechanical or programmable stops to define the retracted and extended positions of the slide-out room. When using programmable stops, the retracted and extended positions of the slide-out room are typically initialized by a technician before the recreational vehicle is sold to the end user. In some cases, extended and retracted positions need to be reprogrammed. This may occur if an actuator fails and is replaced, or if seals on the slide-out room assume a 'set' position over the lifetime of the recreational vehicle.

Slide-out rooms also typically include a lock mechanism which ensures that the seals on the slide-out room are adequately compressed in the retracted position during highway travel. However, the lock mechanism is controlled in an open loop manner by the controller. This can result in damage to components of the vehicle if the slide-out room moves when the lock mechanism is engaged. Additionally, motion of the slide-out room is also controlled in an open loop manner. This can also result in damage to components of the vehicle if the actuators are powered when there is an obstruction in the path of the slide-out room. Due to the above reasons, a need exists for a slide-out room on a recreational vehicle with an improved control system.

SUMMARY OF THE INVENTION

The present invention provides an improved control system for a slide-out room. The control system includes several room slides which move the slide-out room between retracted and extended positions. The control system may include a controller for synchronizing the motion of the room slides, programmable stops defining stop positions for the slide-out room, and buttons to receive commands from a user. The controller may include capabilities for detecting faults in the system. For example, the control system may be able to detect short circuits and open circuits within drive motors on the room slides. In addition, the room slides may be automatically stopped when a fault is detected, and the fault is communicated to the user via LEDs.

In another aspect of the invention, the control system includes a lock which automatically engages the slide-out room when the slide-out room enters the retracted position. The control system also ensures the lock is disengaged before moving the slide-out room.

The foregoing and other advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
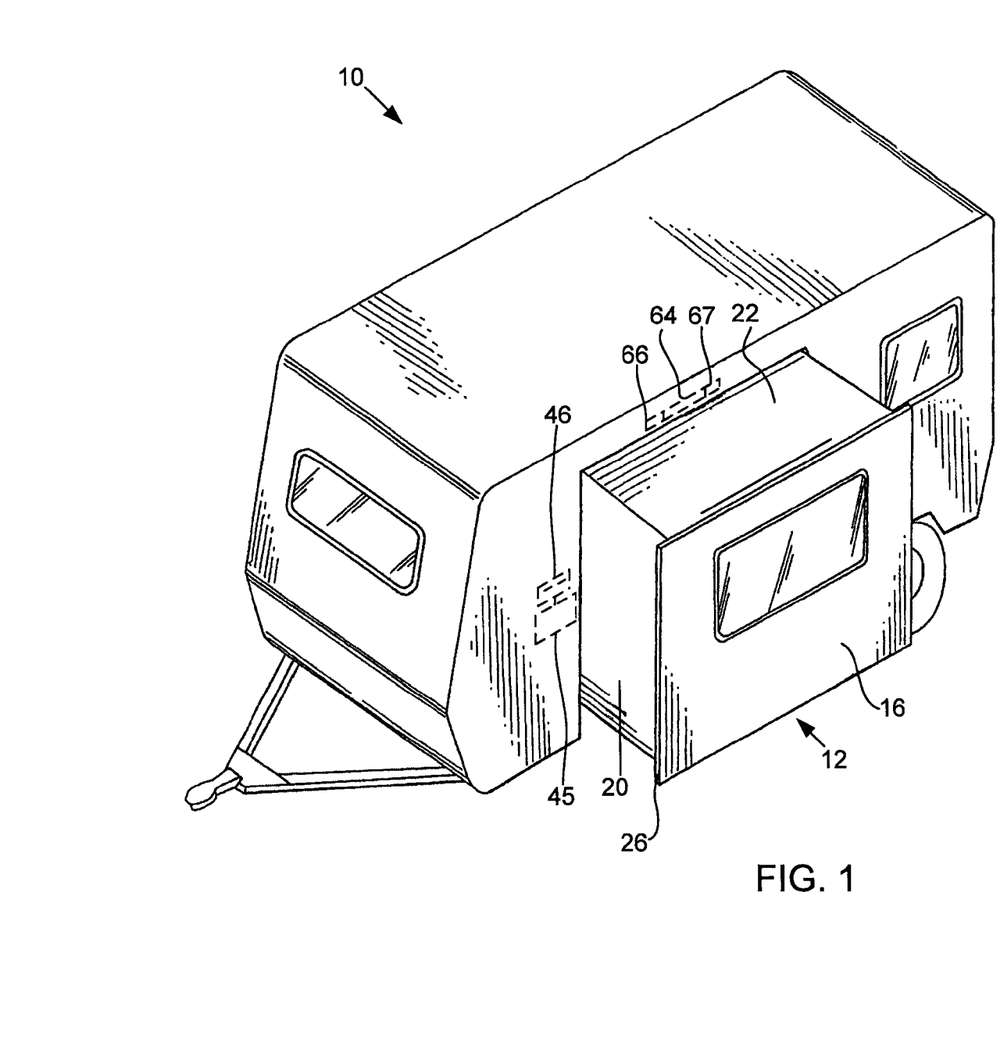
FIG. 1 is a perspective view of a recreational vehicle with a slide-out room.
Figure 2:
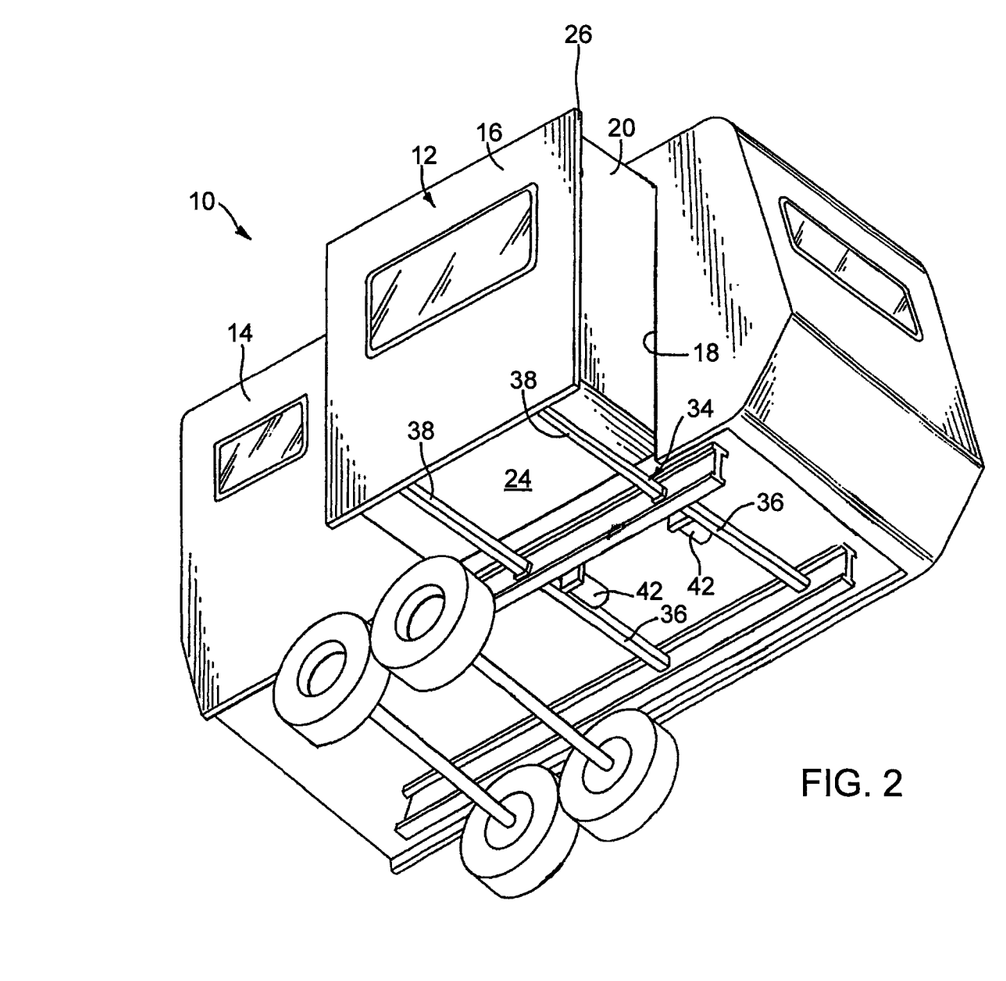
FIG. 2 is a perspective view of the recreational vehicle of FIG. 1 showing room slides on the bottom of the vehicle.

Referring to FIGS. 1 and 2, a recreational vehicle 10 includes a slide-out room 12 located in an opening 18 on a side wall 14. The slide-out room 12 includes a leading wall 16, side walls 20, a ceiling 22, and a floor 24. The leading wall 16 includes a fascia 26. The plane of the fascia 26 is parallel to the respective planes of the opening 18 and the side wall 14. The surface of the fascia 26 facing the side wall 14 includes a seal (not shown). The seal is compressed between the fascia 26 and the side wall 14 when the slide-out room 12 is retracted. This seal prevents leaks between the cabin of the recreational vehicle 10 and its environment when the slide-out room 12 is retracted. The side walls 20 of the slide-out room 12 also include flanges (not shown) located inside the slide-out room 12. The surface of the flanges facing the side wall 14 includes a seal (not shown). The seal prevents leaks between the cabin of the recreational vehicle 10 and its environment when the slide-out room 12 is extended.

A plurality of room slides 34 is included below the floor of the recreational vehicle 10. The room slides 34 extend and retract the slide-out room 12. Two slides 34 are illustrated for the room 12 in FIG. 2. The number of room slides 34 is typically between one and four depending on the size of the recreational vehicle 10, the size of the slide-out room 12, and the power output of each room slide 34. Each room slide 34 includes a slide body 36, an extending section 38, mounting supports (not shown), and a drive motor 42. A free end of the extending section 38 attaches to the fascia 26 on the slide-out room 12. The mounting supports attach the slide body 36 to the bottom of the recreational vehicle 10. Both the extending section 38 and the mounting supports can be connected to their respective section by standard fasteners, such as bolts, screws, and the like. Preferably, the drive motor 42 is a 12V DC motor which drives a power screw (not shown) inside the slide body 36. Motion of the power screw causes extension and retraction of the extending section 38 and the slide-out room 12. In addition, the drive motors 42 preferably include dynamic brakes (not shown) which are connected to the same electrical circuit as the drive motors 42. The dynamic brakes automatically engage at the instant power to the drive motors 42 is interrupted. Other types of room slides are known in the art and may be used. For example, the power screw and motor may be replaced by hydraulic components, e.g., a hydraulic cylinder, or by an electric rack and pinion drive unit. The dynamic brakes may also be replaced by other well-known types of brakes.

The drive motor 42 of each room slide 34 is electrically connected to a controller 45. When more than one room slide 34 is included on the recreational vehicle, the controller 45 ensures synchronized motion of the room slides 34. This ensures the slide-out room 12 moves in a direction perpendicular to the plane of the opening 18 on the side wall 14. Motion in a different direction could cause damage to the side walls 20, the room slides 34, or other components of the recreational vehicle 10. Preferably, the controller 45 monitors the position of each room slide 34 by using a Hall effect sensor (not shown) attached to each drive motor 42. The Hall effect sensors, if included, are preferably bi-directional Hall effect sensors that are capable of indicating the direction of motion of a motor in addition to its rotational position. Alternatively, the position of each room slide 34 can be monitored by any type of position sensor, such as an optical encoder. By monitoring the signal from each sensor, power is supplied to each drive motor 42 in a manner which ensures uniform extension of the room slides 34. Operation of the slide-out room will be discussed in further detail below.

A battery (not shown) is also electrically connected to the controller 45. Any suitable battery may be used as long as it satisfies the power requirements of the controller 45. Alternatively, the battery may be replaced by a power cord to connect to a 120V wall outlet. One with ordinary skill in the art would also recognize that a transformer could be included in the circuit to modify the voltage obtained from the wall outlet.

Figure 3A:
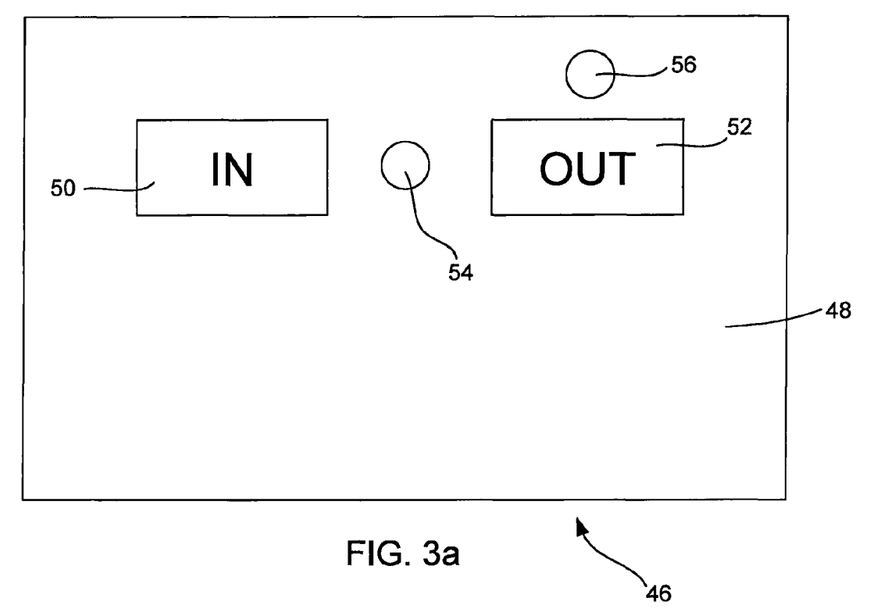
FIG. 3a is a view of a front face of a control panel for the slide-out room.
Figure 3B:
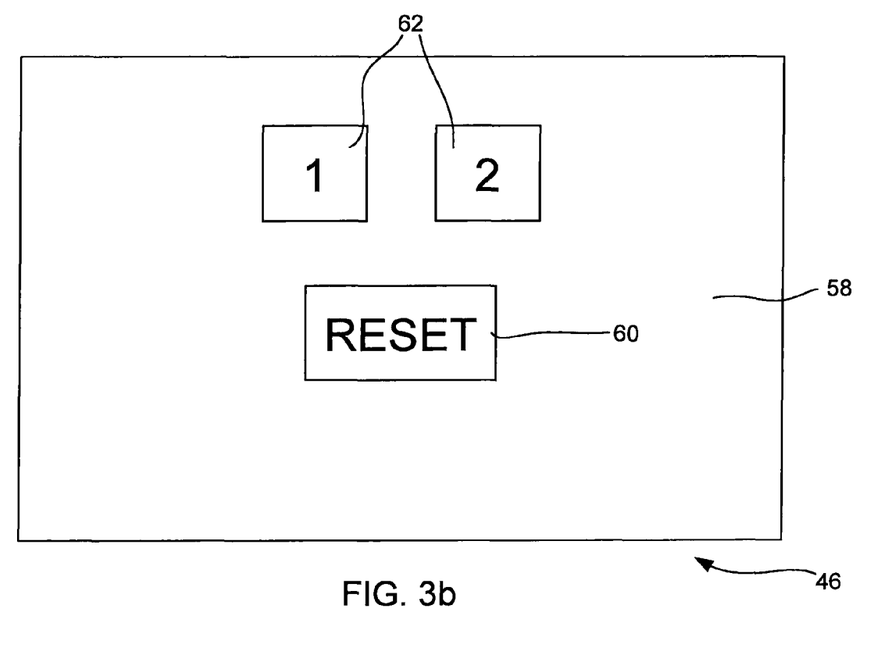
FIG. 3b is a view of a back face of the control panel for the slide-out room.

Referring to FIGS. 3*a* and 3*b*, a recreational vehicle 10 includes a control panel 46 that is electrically connected to the controller 45. The respective positions of the controller 45 and the control panel 46 are not limited to that shown in FIG. 1; they may be located anywhere on the recreational vehicle 10. Preferably, the controller 45 is located inside a wall since it does not need to be accessed by the end user. Also, the control panel 46 is preferably inside the cabin for protection from precipitation. The control panel 46 is accommodated in such a way that the end user has access to a front face 48 of the control panel 46. The front face 48 of the control panel 46 includes IN button 50, OUT button 52, green movement indicating LED 54, and red fault indicating LED 56. In general, the IN button 50 moves the slide-out room to the retracted position. The OUT button 52 moves the slide-out room to the extended position. The green movement indicating LED 54 indicates movement of at least one component of the slide-out room system, and red fault indicating LED 56 indicates a fault within the system. The LEDs also provide diagnostic codes which will be discussed in further detail below.

The control panel 46 is also accommodated in such a way that the back face 58 is not normally accessible by the end user. Preferably, the control panel 46 is recessed in a wall of the recreational vehicle 10. Alternatively, the back face 58 of control panel 46 is fastened to an inner wall of the recreational vehicle 10. In either case, the control panel 46 is held in place by bolts, screws, snap-fit tabs, or the like. The back face 58 of the control panel 46 includes a reset button 60, and motor selection buttons 62. The number of motor selection buttons 62 corresponds to the number of motors driving the room slide mechanisms 34 on the vehicle 10. These buttons are used for resetting the programmable stops. It should be understood that the term 'programmable stops' refers to the extended and retracted positions of the slide-out room 12 stored in the memory of the controller 45. The process for setting the programmable stops will be discussed in further detail below.

Referring to FIG. 1, the recreational vehicle 10 also includes a lock 64 located near the slide-out room 12. The position of the lock 64 may be on the side wall 14 of the vehicle 10 as shown in FIG. 1. Alternatively, the lock 64 may be on one of the side walls 20 or the ceiling 22 of the slide-out room 12. The lock 64 is engaged when the slide-out room 12 is retracted. The lock 64 includes a lock motor 66 and a normally open limit switch 67. The lock motor 66 and the limit switch 67 are electrically connected to the controller. When closed, the limit switch 67 indicates that the lock 64 is disengaged. The controller only supplies power to the room slides 34 if the lock 64 is disengaged. This process will be discussed in further detail below. In addition, the system preferably includes a current sensor (not shown) that indicates if the lock 64 is engaged. That is, the current supplied to the lock 64 will suddenly increase when the lock 64 has reached engagement. The current sensor sends a signal to the controller due to this sudden current increase and the controller stops powering the lock 64 thereafter.

Figure 11:
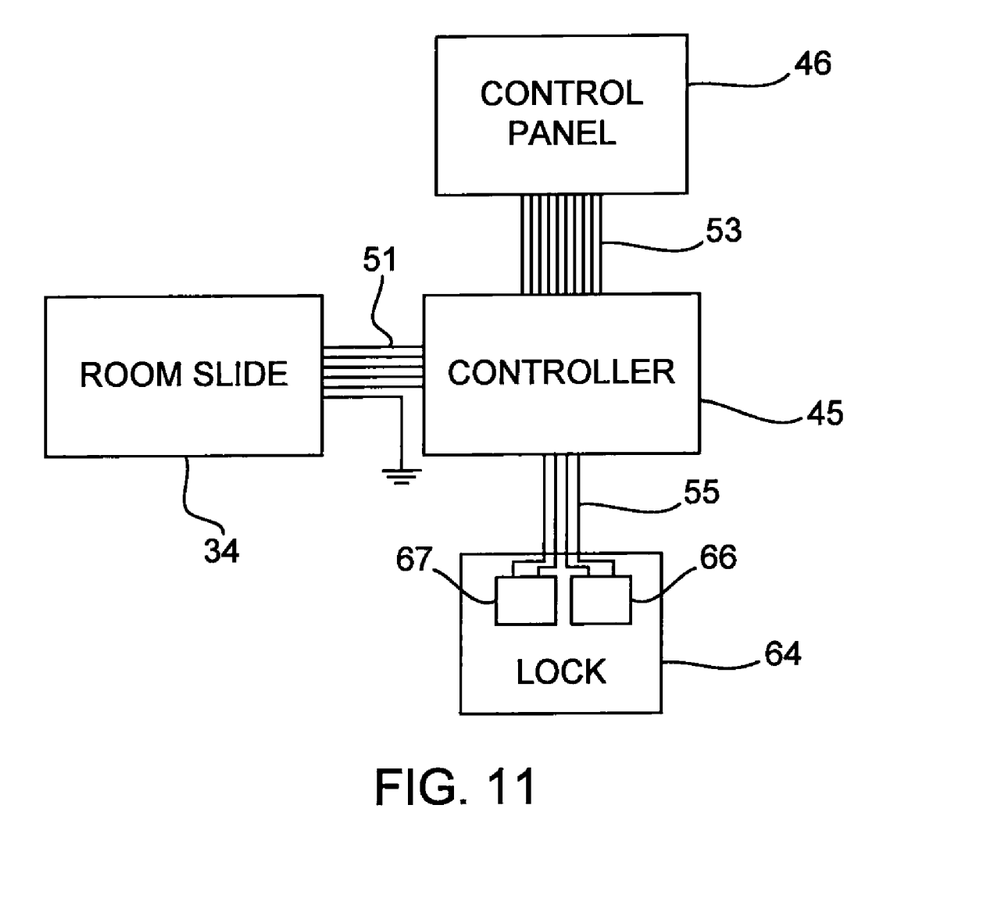
FIG. 11 shows an electrical circuit diagram of a controller, a control panel, a room slide, and a lock of the present invention.

As discussed above, each room slide 34, the control panel 46, and the lock 64 are electrically connected to the controller 45. A schematic diagram of these components is shown in FIG. 11. It should be noted that this circuit includes only a single room slide 34. However, additional room slides 34 may be connected to the controller 45 as described below. The controller 45 preferably connects to the room slide 34 via five electrical wires 51. Two wires 51 connect to the drive motor 42 of the room slide 34 and three wires 51 connect to the Hall effect sensor of the room slide 34. Two wires 51 from the Hall effect sensor serve as common signal wires and the third wire 51 provides power from the controller 45. In addition, a sixth wire 51 connects the Hall effect sensor to ground.

The controller 45 preferably connects to the control panel 46 via ten electrical wires 53 if the recreational vehicle 10 includes four room slides 34. Each wire 53 corresponds to a button (there are seven buttons in this example) or LED (there are two LEDs) on the control panel 46, and one wire 53 provides power from the controller 45 to the control panel 46 (for a total of ten wires 53 in this example). The controller 45 preferably connects to the lock 64 via four wires 55. Two wires 55 connect to the limit switch 67 of the lock 64 and two wires 55 connect to the lock motor 66. Any appropriate gage size may be used for the wires 51, 53, and 55 and any appropriate electrical connectors may be connected to the ends of the wires to physically connect the aforementioned components.

Figure 4A:
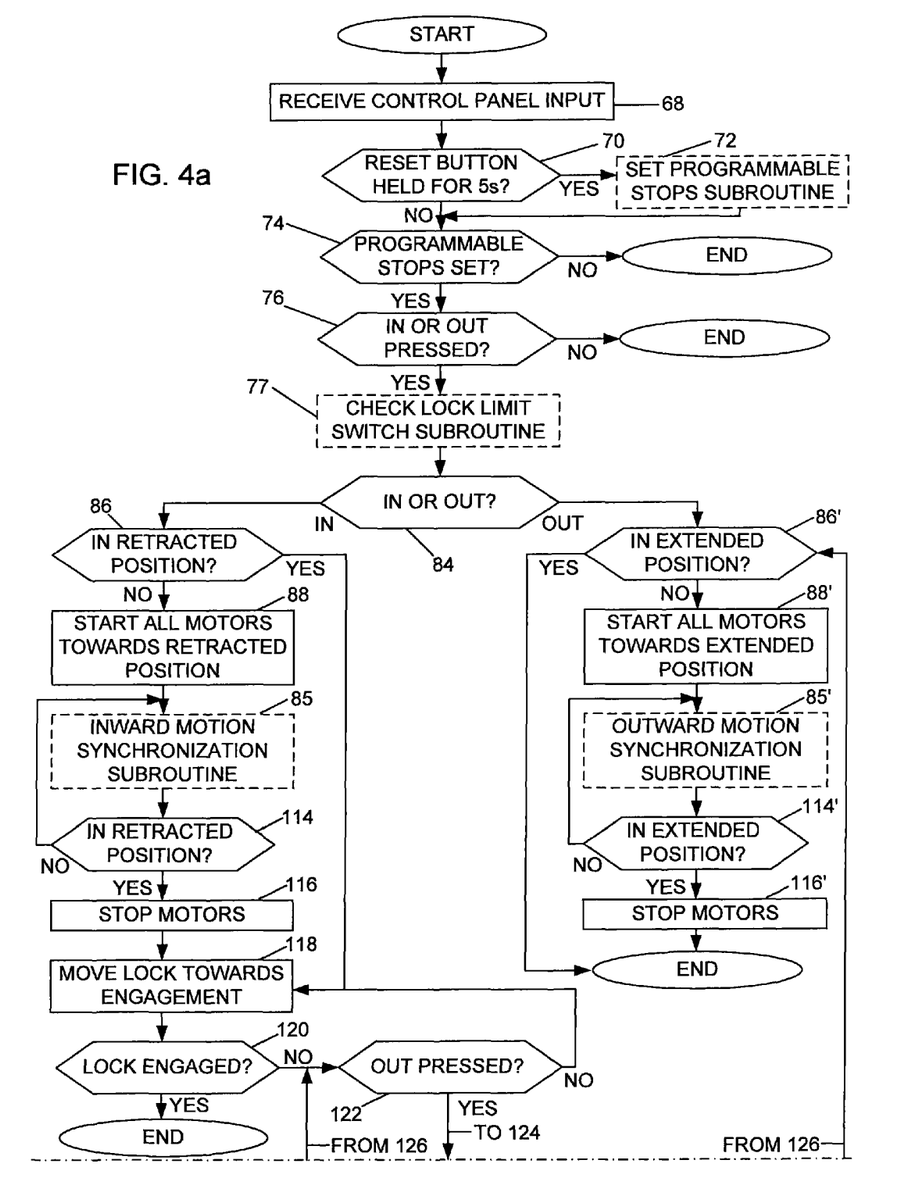
FIGS. 4a and 4b show a flow chart of a main program of a controller of the recreational vehicle of FIG. 1.
Figure 4B:
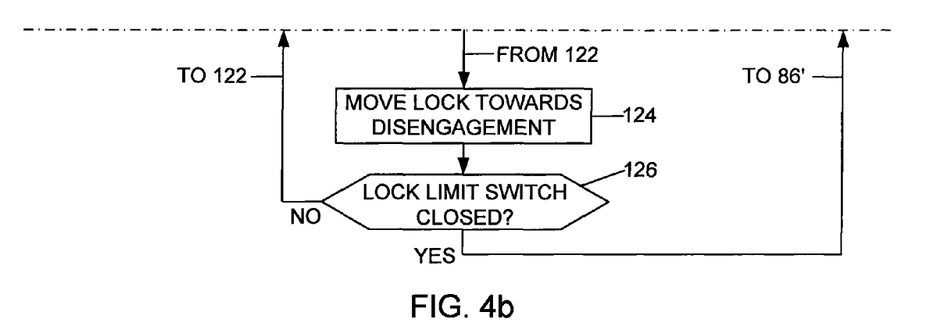
Figure 5:
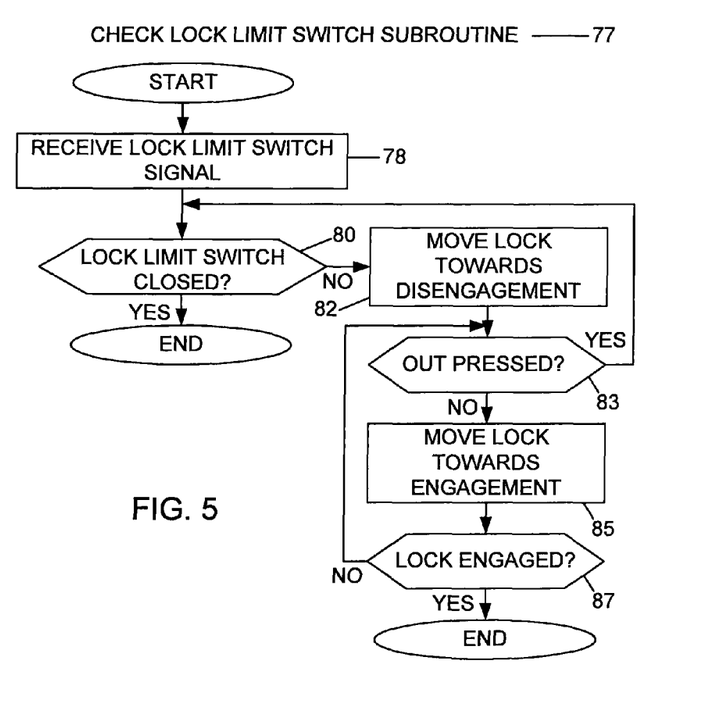
FIG. 5 shows a flow chart of a subroutine to check a lock limit switch.

The operation of the slide-out room 12 begins when a button on the control panel 46 is pressed, as shown in FIG. 4a. As indicated at program step 68, the controller receives the input from the control panel 46. At 70, the controller determines if the reset button 60 has been held for five seconds, which starts the subroutine to set the programmable stops 72. The subroutine to set the programmable stops 72 will be discussed in further detail below. If the reset button 60 has not been held for five seconds, the controller determines if the programmable stops are set at 74. If the programmable stops are not set, the program ends. Otherwise, the controller proceeds to determine if either the IN button 50 or the OUT button 52 has been pushed at 76. If neither has been pushed, the program ends. Otherwise, the controller 45 checks the limit switch 67 attached to the lock 64 using a subroutine at 77. Referring to FIG. 5, the controller 45 receives a signal from the limit switch 67 at 78. If the limit switch 67 is not closed at 80, the lock 64 moves towards disengagement at 82. The OUT button 52 must be held during this subroutine 77 for the lock 64 to be disengaged as indicted at 83. Once the lock 64 is disengaged at 80, the subroutine 77 ends. However, if the OUT button 52 is released before the lock 64 is disengaged at 80, the lock 64 will move toward engagement at 85. As the lock 64 moves toward engagement at 85, the controller continues to monitor the OUT button 52 at 83. If the lock 64 reaches engagement at 87, the program ends. In addition, the program will not continue at 84 on FIG. 4a, but will instead restart at the beginning since the lock 64 is engaged. Returning to the main program, the controller next determines which button has been pushed at 84. If the IN button 50 has been pressed, the controller checks if the slide-out room is already in the retracted position at 86. If this is the case, the program does not move the room slides 34 and moves the lock 64 towards engagement. Otherwise, the controller provides power to the drive motors 42 such that the slide-out room 12 moves towards the retracted position at 88.

As the drive motors 42 move the slide-out room 12, the controller uses an inward motion synchronization subroutine 85 (FIG. 7) to monitor the position of each room slide 34. Here, it is assumed that the recreational vehicle 10 includes four room slides 34. First, the controller checks the position of the first room slide relative to the other room slides at 90. If the first room slide is further from the retracted position than any other room slide by a preset limit, all other room slides are stopped momentarily at 92. All other room slides remain stationary until the first room slide is no longer further from the retracted position than any other room slide by the preset limit, as shown at 94. The controller also checks the locations of the second, third, and fourth room slides at 96, 102, and 108 respectively. If the second, third, or fourth room slide is further from the retracted position than any other room slide by the preset limit, all other room slides are stopped momentarily at 98, 104, and 110 respectively. All other room slides remain stationary until the second, third, or fourth room slide is no longer further from the retracted position than any other room slide by the preset limit, as shown at 100, 106, and 112, respectively. At 114, the controller checks the position of the room slides 34. If the room slides 34 are not in the retracted position, the drive motors 42 continue to run and the controller continues to synchronize the motion of the room slides 34. Otherwise, the drive motors 42 are stopped at 116.

Figure 7:
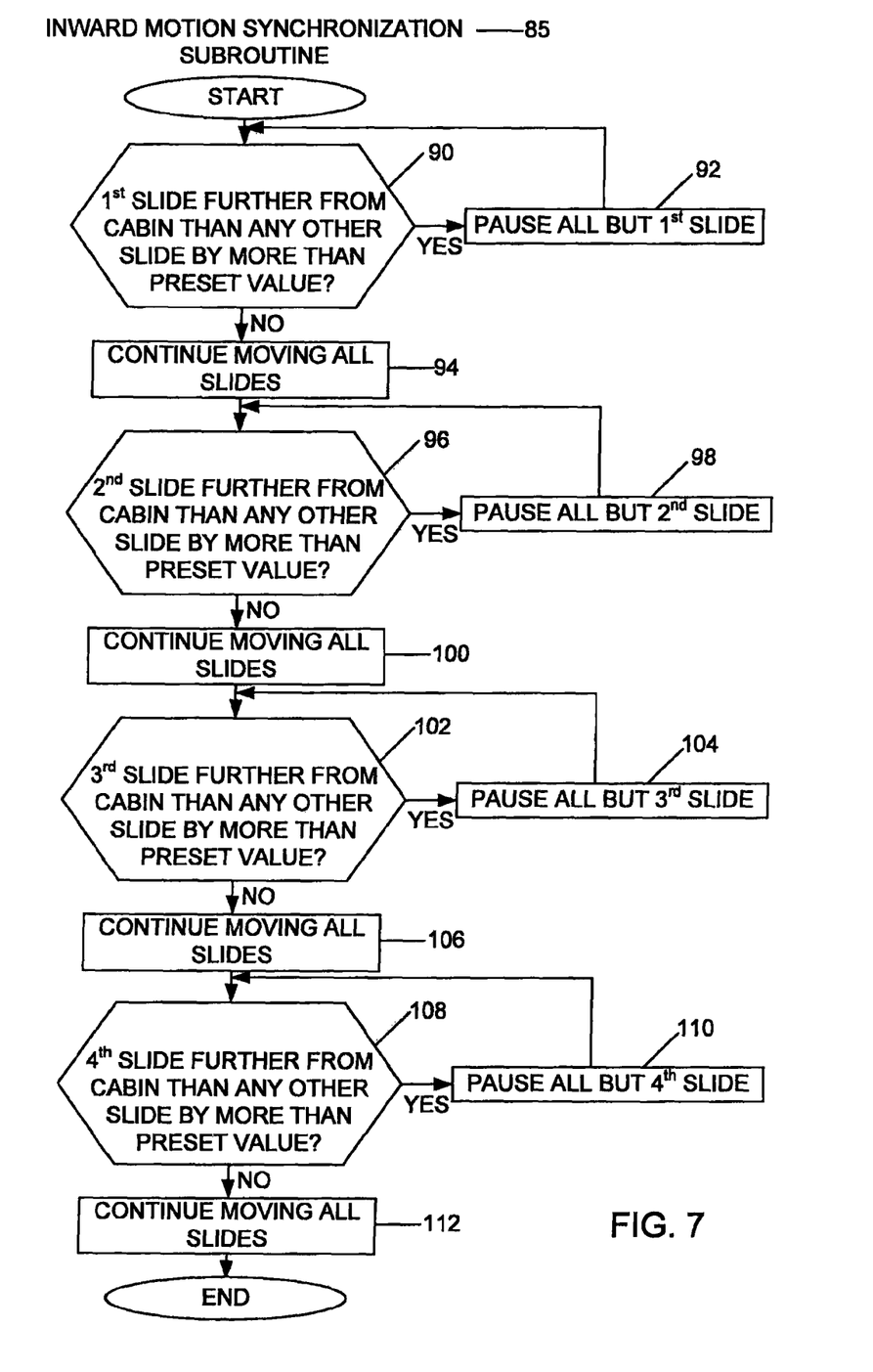
FIG. 7 shows a flow chart of a subroutine for inward motion synchronization.

The lock 64 is automatically engaged as follows. At 118, the lock motor 66 receives power from the controller and moves the lock 64 towards the engagement position. If the lock 64 reaches the engagement position at 120, the program ends. However, while the lock 64 is moving, the OUT button 52 may be pressed as shown at 122. Pressing and holding the OUT button 52 moves the lock 64 towards disengagement at 124. If the OUT button 52 is released before the lock is disengaged at 126, the lock 64 will return to 118 and move towards engagement. Otherwise, if the lock is disengaged at 126, the program will extend the room slides 34 starting at 86'.

Figure 8:
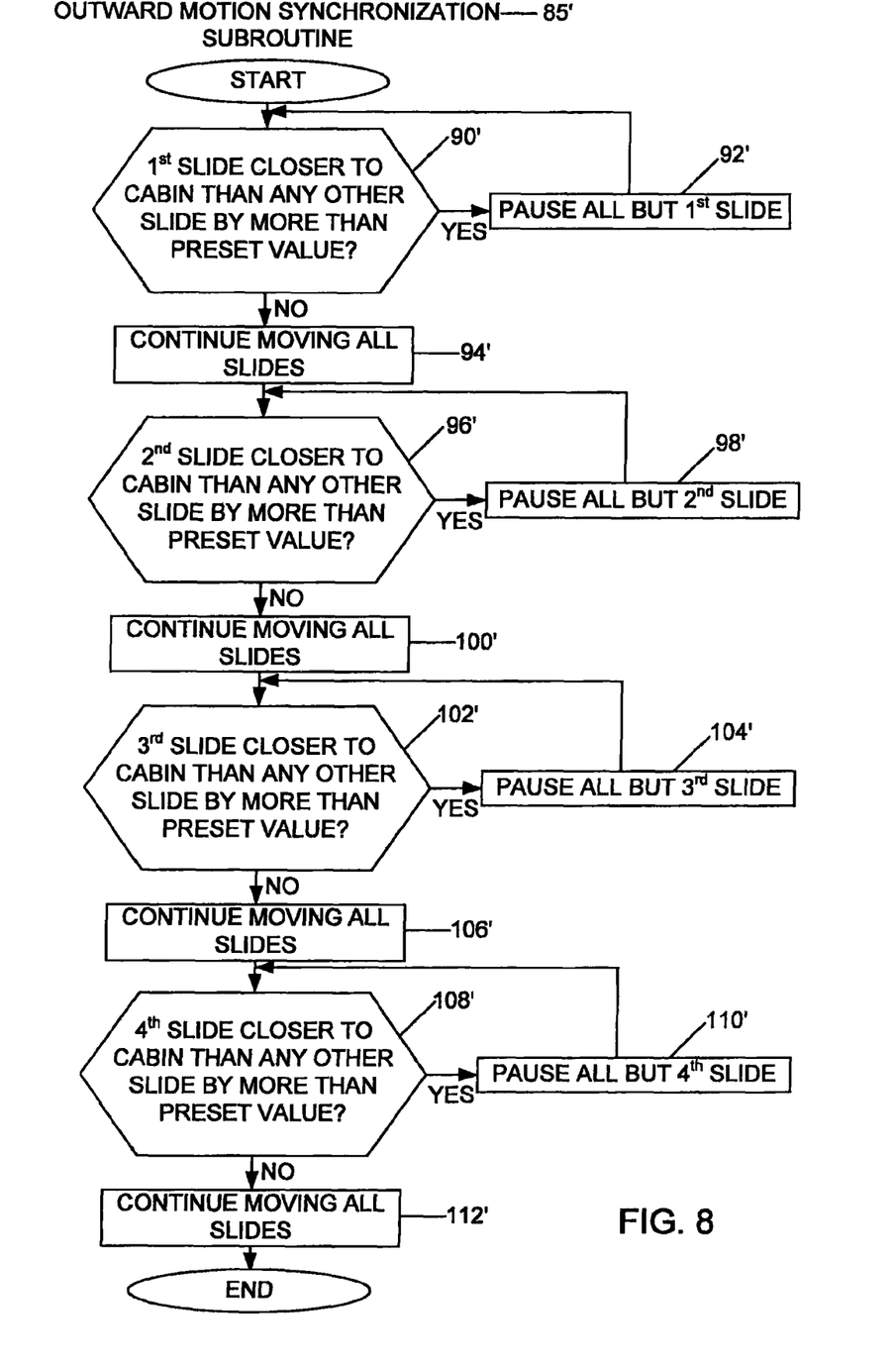
FIG. 8 shows a flow chart of a subroutine for outward motion synchronization.

It should be noted that the process to move the slide-out room 12 to the extended position is similar to the process described above. Specifically, this process includes the steps 86', 88', 90', 92', 94', 96', 98', 100', 102', 104', 106', 108', 110', 112', 114', and 116', as shown in FIGS. 4a and 8. However, the lock 64 is not engaged after the slide-out room 12 reaches the extended position. Additionally, as mentioned previously, the number of room slides 34 depends on the size of the vehicle components and the power output of the drive motors 42. Operation of the slide-out room 12 can be modified to accommodate different numbers of room slides 34. That is, the number of room slide position checks (90, 90', 96, 96', 102, 102', 108, and 108' from above) should correspond to the number of room slides 34. However, no room slide position checks are needed if only a single room slide 34 is used.

Figure 9:
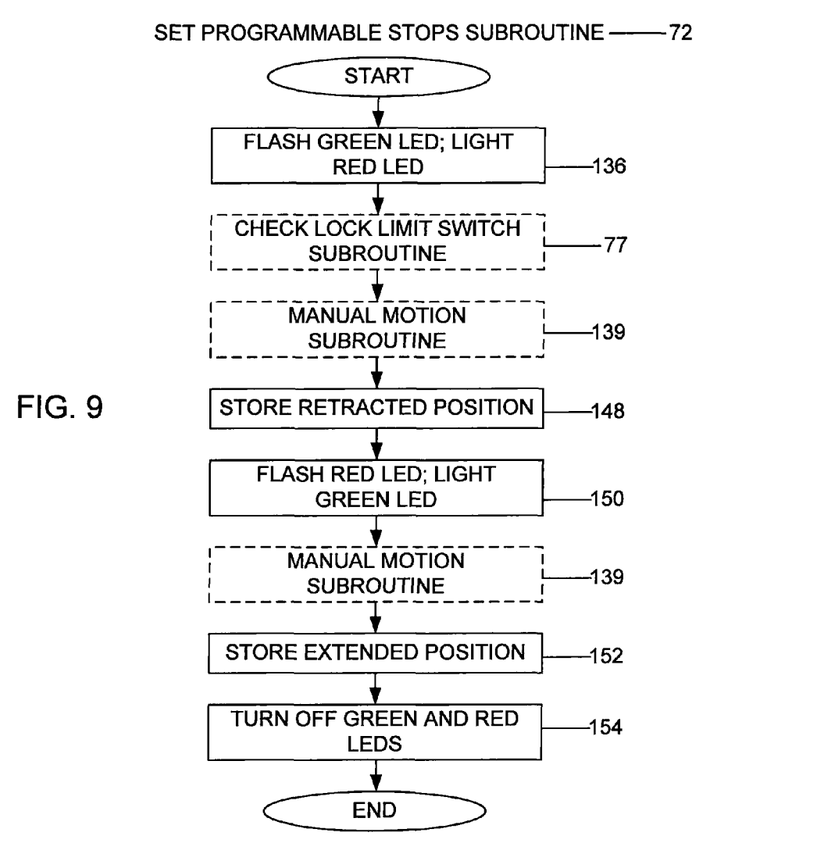
FIG. 9 shows a flow chart of a subroutine to set programmable stops stored by the controller.

Holding the reset button 60 for five seconds starts the subroutine to set the programmable stops 72. As shown in FIG. 9, the green movement indicating LED 54 flashes and the red fault indicating LED 56 is lit at 136 to indicate the subroutine to set the programmable stops 72 has been entered. At 77, the lock limit switch 67 is checked using the subroutine 77. Next, the program enters a manual motion subroutine 139 (FIG. 6) permitting the user to move the slide-out room 12 to the retracted position. The user presses any combination of the motor selection buttons 62. The controller 45 receives a signal from the control panel 46 specifying which motor selection buttons 62 are pressed at 140. Next, the controller 45 determines whether the IN button 50 or the OUT button 52 is pressed at 142. If the IN button 50 is pressed, the selected drive motors 42 are powered and move the slide-out room 12 towards the cabin at 143. The selected drive motors 42 are powered as long as the IN button 50 is held, as indicated by 144. When the IN button 50 is released, the drive motors 42 are stopped at 145. Next, the controller 45 determines if the previous combination of motor selection buttons 62 is still held at 146. If this is the case, the program returns to determine whether the IN button 50 or the OUT button 52 is pressed at 142. Otherwise, the program proceeds to determine if the reset button 60 is pressed at 147. If it is not, the program returns to the beginning of the manual motion subroutine 139. If the reset button 60 is pressed, the retracted position of the slide-out room 12 is stored at 148. It should be understood that pressing the OUT button 52 results in using similar programming steps (143', 144', 145', and 146') to those of pressing the IN button 50.

Figure 6:
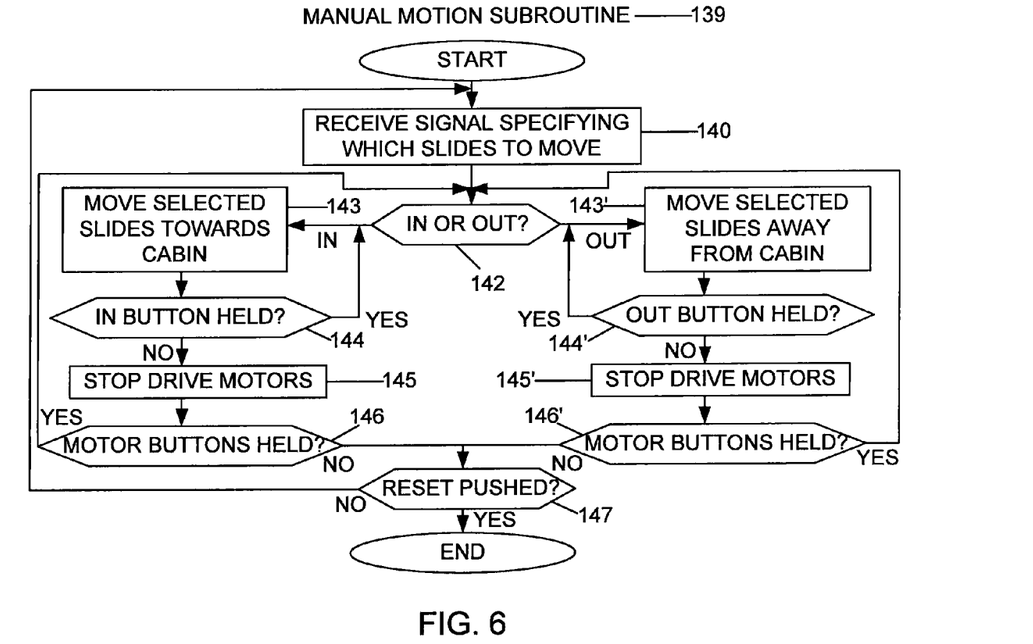
FIG. 6 shows a flow chart of a subroutine for manual motion of the slide-out room.

Next, the user proceeds to set the extended position of the slide-out room 12. This is indicated by the red fault indicating LED 56 flashing and the green movement indicating LED 54 remaining lit at 150. The program calls the manual motion subroutine 139 permitting the user to move the slide-out room 12 to the extended position. The manual motion subroutine 139 ends when the reset button is pushed at 147, and the extended position of the slide-out room 12 is stored at 152. The green movement indicating LED 54 and the red fault indicating LED 56 turn off at 154 to indicate that the retracted and extended positions have been programmed successfully. Alternatively, the green movement indicating LED 54 flashes rapidly for 10 seconds to indicate that the retracted and extended positions have not been programmed successfully. In addition, the controller includes a timeout mechanism in the subroutine to set the programmable stops 72. If no button is pushed for 45 seconds, the program will exit this subroutine and return to the main program.

Figure 10:
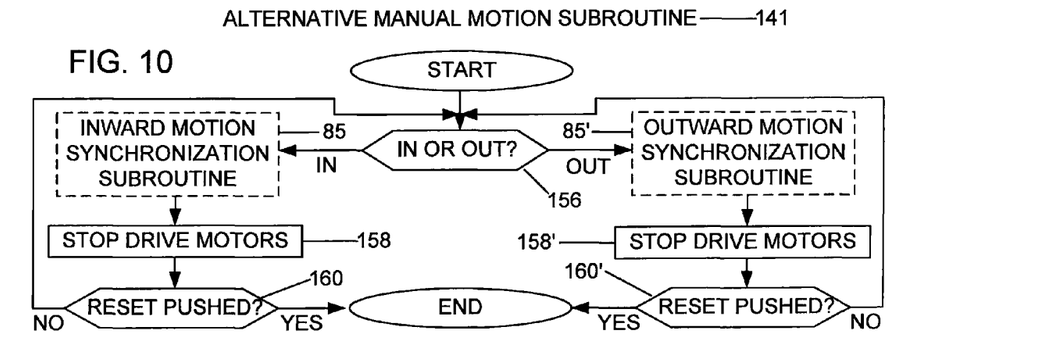
FIG. 10 shows a flow chart of an alternative subroutine for manual motion of the slide-out room.

An alternative manual motion subroutine 141 can use the inward motion synchronization subroutine 85 and the outward motion synchronization subroutine 85' as shown in FIG. 10. In this subroutine, the controller determines whether the IN button 50 or the OUT button 52 has been pressed at 156. If the IN button 50 has been pressed, the drive motors 42 are powered to move the slide-out room 12 towards the cabin of the recreational vehicle 10. As long as the IN button 50 is held, the drive motors 42 continue to move using the inward motion synchronization subroutine 85. When the IN button 50 is released, the drive motors 42 are stopped at 158. At 160, the controller determines if the reset button 60 has been pressed. If the reset button 60 has not been pressed, the program returns to step 156 to determine if the IN button 50 or the OUT button 52 has been pressed. If the reset button 60 has been pressed, the program exits the subroutine. It should be understood that pressing the OUT button 52 results in using similar programming steps (85', 158', and 160') to those of pressing the IN button 50.

The controller also includes fault detection capabilities and a means for communicating faults to the user. Motion of the slide-out room 12 will automatically stop in any part of the program if any fault is detected. The slide-out room 12 will not move until the fault is resolved. The faults recognized by the controller include those listed in the following table.

| Fault Code | Fault Type | Description | Probable Cause | Solution |
|---|---|---|---|---|
| 1 | Major | Stops not programmed. | No programmable stops have been set for the control. | Set programmable stops. |
| 2 | Minor | Battery dropout voltage; voltage dropped below 8.0 V while room was moving. | Bad wire connection from battery to control or low battery. | Repair bad wire connection or replace battery. |
| 3 | Minor | Low battery voltage; voltage is below 10.5 V when room movement was initiated. | Bad wire connection from battery to control or low battery. | Repair bad wire connection or replace battery. |
| 4 | Minor | Excessive battery voltage; battery voltage is above 18.0 V when room movement was initiated. | Bad battery. | Replace battery. |
| 5 | Major | Drive motor drawing excessive current. | Excessive system/room drag, obstruction, improper stop locations or damaged component. | Remove obstruction, re-adjust room, reset stops or replace damaged component. |
| 6 | Major | Drive motor shorted. | Shorted wiring or motor. | Inspect motor harness wires and motor for shorts; replace shorted component. |
| 7 | Major | Drive motor open. | Bad connection or motor. | Repair bad wire connection or replace motor. |
| 8 | Major | No signal on motor sensor OUT 1 (yellow) wire. | Bad wire connection or sensor. | Repair bad wire connection or replace motor. |
| 9 | Major | No signal on motor sensor OUT 2 (blue) wire. | Bad wire connection or sensor. | Repair bad wire connection or replace motor. |
| 10 | Major | No signal on motor sensor OUT 1 (yellow) wire and no signal on motor sensor OUT 2 (blue) wire. | Bad wire connection or sensor. | Repair bad wire connection or replace motor. |
| 11 | Major | Lock motor drawing excessive current. | Excessive drag or obstruction or damaged component. | Remove obstruction or replace damaged component. |
| 12 | Major | Lock motor short. | Shorted wiring or motor. | Inspect motor harness wires and motor for shorts; replace shorted component. |
| 13 | Major | Lock motor open. | Bad connection or motor. | Repair bad wire connection or replace motor |
| 14 | Minor | Lock timeout. | Obstruction or low voltage. | Remove obstruction, repair bad wire connection or replace battery. |

Minor faults are addressed using the solutions in the fifth column. The IN button 50 and the OUT button 52 may be used to move the slide-out room 12 immediately after a minor fault is resolved. Major faults are also addressed using the solutions in the fifth column. However, the reset button 60 must be pressed before the IN button 50 and the OUT button 52 may be used to move the slide-out room 12 after a major fault is resolved.

Faults are communicated to the user via the LEDs 54 and 56. The red fault indicating LED 56 flashes a number of times corresponding to the fault code number listed in the table.

Additionally, some faults may only occur for individual drive motors 42. The green movement indicating LED 54 flashes a number of times corresponding to the number of the affected motor. Additionally, the battery dropout voltage, low battery voltage, and excessive battery voltage values (8.0V, 10.5V, and 18.0V in the table) can be modified to any values appropriate for the battery used with the recreational vehicle 10. Also, the excessive current value can be specified based on the current input requirements of the drive motors 42 and the lock motor 66.

It is specifically intended that the present invention not be limited to the embodiments and illustrations contained herein, but include modified forms of those embodiments including portions of the embodiments and combinations of elements of different embodiments as defined within the scope of the following claims.

I claim:

1. A control system for a slide-out room, the slide-out room including at least one room slide for moving the slide-out room and a lock for holding the slide-out room in a retracted position when the lock is engaged, comprising:
a controller being operatively connected to the at least one room slide for controlling the motion of the at least one room slide, the controller being programmable to define stop positions for the slide-out room, and the controller being operatively connected to the lock;
a control panel including buttons to receive commands from a user, the control panel being operatively connected to the controller; and
wherein when the control panel is activated to extend the slide-out room the controller receives an extend signal from the control panel and the controller checks the position of the lock and if the lock is engaged the controller sends a disengage signal to the lock to disengage, and when the lock is disengaged the controller receives a disengaged signal from the lock and thereafter the controller sends a room slide extend signal to the at least one room slide to extend the slide-out room.

2. The control system of claim 1, wherein the control system ensures the lock is disengaged before moving the slide-out room via a normally open limit switch.

3. The control system of claim 1, wherein the control system is capable of detecting if excessive current is supplied to a lock motor.

4. The control system of claim 1, wherein the control system is capable of detecting a short circuit in a lock motor.

5. The control system of claim 1, wherein the control system is capable of detecting an open circuit in a lock motor.

6. The control system of claim 1, wherein the lock automatically engages the slide-out room after the slide-out room enters a retracted position.

7. The control system of claim 1, wherein the control system includes a first button that is held by the user to move the lock to disengage from the slide-out room.

8. The control system of claim 7, wherein the control system moves the lock to engage the slide-out room when the first button is not held.

9. The control system of claim 1, wherein the system includes at least one room slide in addition to the at least one room slide, both room slides being operable to move the slide-out room, and wherein the controller synchronizes the motion of the room slides to move the slide-out room in concert with one another.

10. The control system of claim 1, wherein when the slide-out room is in an extended position and the control panel is activated to retract the slide-out room the controller receives a retract signal from the control panel and the controller checks the position of the lock and if the lock is engaged the controller sends the disengage signal to the lock to disengage, and when the lock is disengaged the controller receives the disengaged signal from the lock and thereafter the controller sends a room slide retract signal to the at least one room slide to retract the slide-out room.

11. A control system for a slide-out room comprising:
a plurality of room slides for moving the slide-out room;
a lock for holding the slide-out room in a retracted position when the lock is engaged;
a control panel including buttons to receive commands from a user;
a controller being programmable to define stop positions for the slide-out room, the controller being operatively connected to the plurality of room slides for controlling the motion of the room slides, and the controller being operatively connected to the lock and the control panel;
wherein when the control panel is activated to extend the slide-out room the controller receives an extend signal from the control panel and the controller checks the position of the lock and if the lock is engaged the controller sends a disengage signal to the lock to disengage, and when the lock is disengaged the controller receives a disengaged signal from the lock and thereafter the controller sends a room slide extend signal to the at least one room slide to extend the slide-out room;
wherein when the slide-out room is in an extended position and the control panel is activated to retract the slide-out room the controller receives a retract signal from the control panel and the controller checks the position of the lock and if the lock is engaged the controller sends the disengage signal to the lock to disengage, and when the lock is disengaged the controller receives the disengaged signal from the lock and thereafter the controller sends a room slide retract signal to the at least one room slide to retract the slide-out room; and
wherein the controller synchronizes the motion of the plurality of room slides to move the slide-out room in concert with one another.

12. The control system of claim 11, wherein the control system ensures the lock is disengaged before moving the slide-out room via a normally open limit switch.

13. The control system of claim 11, wherein the control system is capable of detecting if excessive current is supplied to a lock motor.

14. The control system of claim 11, wherein the control system is capable of detecting a short circuit in a lock motor.

15. The control system of claim 11, wherein the control system is capable of detecting an open circuit in a lock motor.

16. The control system of claim 11, wherein the lock automatically engages the slide-out room after the slide-out room enters a retracted position.

17. The control system of claim 11, wherein the control system includes a first button that is held by the user to move the lock to disengage from the slide-out room.

18. The control system of claim 17, wherein the control system moves the lock to engage the slide-out room when the first button is not held.

* * * * *